(12) United States Patent
Hurtta

(10) Patent No.: US 7,580,714 B2
(45) Date of Patent: Aug. 25, 2009

(54) METHOD FOR ATTACHING A MOBILE EQUIPMENT TO A WIRELESS COMMUNICATION NETWORK

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/347,646

(22) Filed: Feb. 6, 2006

(65) Prior Publication Data

US 2006/0128389 A1 Jun. 15, 2006

Related U.S. Application Data

(62) Division of application No. 10/381,937, filed as application No. PCT/EP00/10111 on Oct. 13, 2000, now Pat. No. 7,035,621.

(51) Int. Cl.
*H04Q 7/20* (2006.01)

(52) U.S. Cl. .................. 455/450; 370/310; 370/335; 370/349; 709/227; 709/230; 714/748; 714/749

(58) Field of Classification Search ............ 455/445, 455/412.1, 450; 370/310, 335, 349; 709/227, 709/230; 714/748, 749
See application file for complete search history.

(56) References Cited

U.S. PATENT DOCUMENTS

| 6,081,731 | A | 6/2000 | Boltz et al. | |
|---|---|---|---|---|
| 6,272,332 | B1 | 8/2001 | Matsumoto et al. | |
| 6,708,034 | B1* | 3/2004 | Sen et al. | 455/445 |
| 7,035,621 | B1* | 4/2006 | Hurtta | 455/412.1 |
| 7,190,684 | B2* | 3/2007 | Cao et al. | 370/335 |
| 7,254,765 | B2* | 8/2007 | Meyer et al. | 714/748 |
| 2004/0014466 | A1 | 1/2004 | Jesse et al. | |
| 2006/0268818 | A1* | 11/2006 | Chen et al. | 370/349 |
| 2007/0079207 | A1* | 4/2007 | Seidel et al. | 714/748 |
| 2007/0106924 | A1* | 5/2007 | Seidel et al. | 714/748 |
| 2007/0168827 | A1* | 7/2007 | Lohr et al. | 714/749 |
| 2007/0204050 | A1* | 8/2007 | Liu et al. | 709/230 |
| 2007/0214269 | A1* | 9/2007 | Davidsson | 709/227 |
| 2007/0223409 | A1* | 9/2007 | Herrero | 370/310 |
| 2007/0275728 | A1* | 11/2007 | Lohr et al. | 455/450 |

FOREIGN PATENT DOCUMENTS

| DE | 197 42 681 | 4/1999 |
|---|---|---|
| EP | 0 971 550 | 1/2000 |

OTHER PUBLICATIONS

3GPP—3GTS 23.060 V3.4.0 (1000-07), 3$^{rd}$ Generation partnership Project; Technical Specification Group Services and System Aspects; General Packet Radio Service (GPRS); Service description: Stage 2, (Release 1999).

* cited by examiner

*Primary Examiner*—William D Cumming
(74) *Attorney, Agent, or Firm*—Alston & Bird LLP

(57) ABSTRACT

The invention provides a method and device which may perform a combined attach and communication connection establishment procedure when attaching (S1) an equipment such as a mobile station to a mobile communication network. An attach request sent form the equipment may initiate this combined attach and communication connection establishment process (S2). In the Home Location Register, communication connection parameters are set as default values which may be automatically selected (S4), for instance when receiving a combined attach and communication connection establishment request. The combined attach and communication connection establishment process reduces the signaling load in the network and speeds up communication connection establishment.

9 Claims, 4 Drawing Sheets

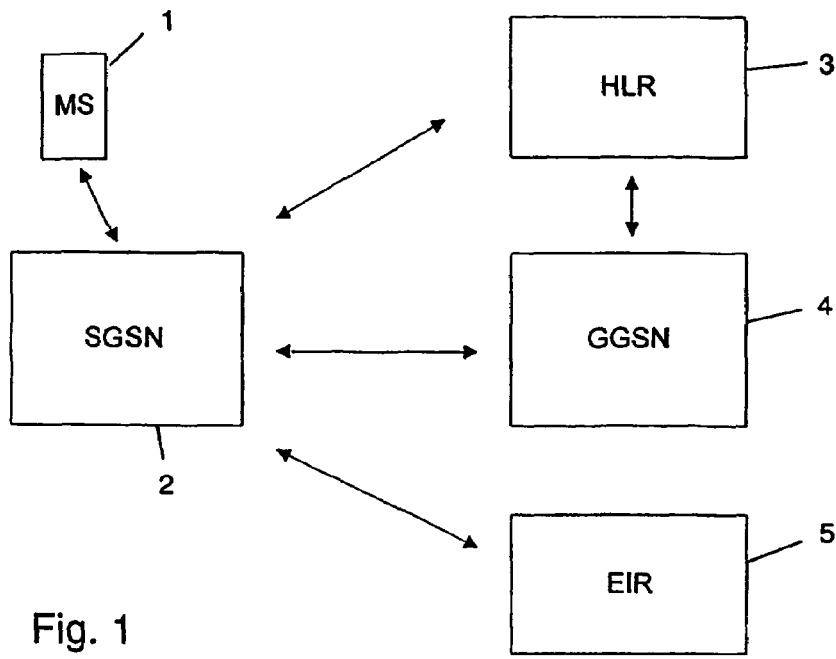
Fig. 1
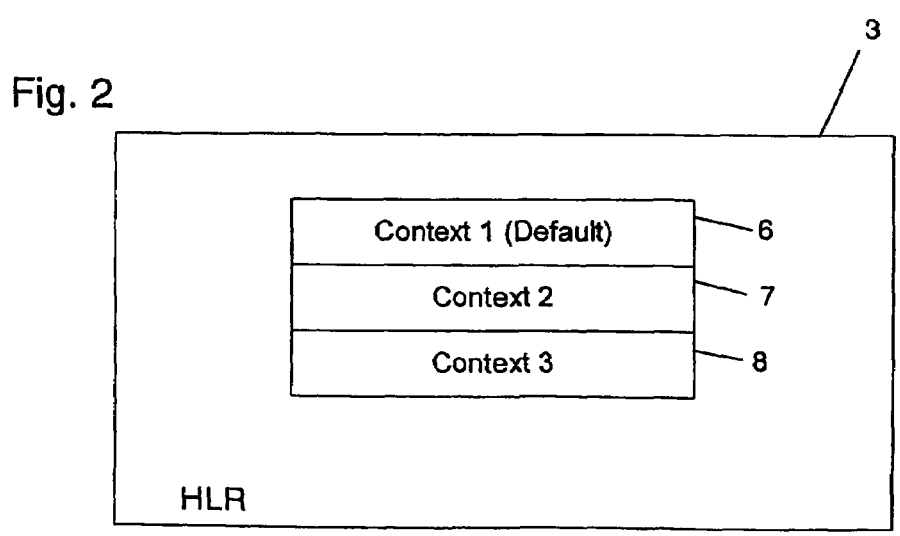
Fig. 2
Fig. 3
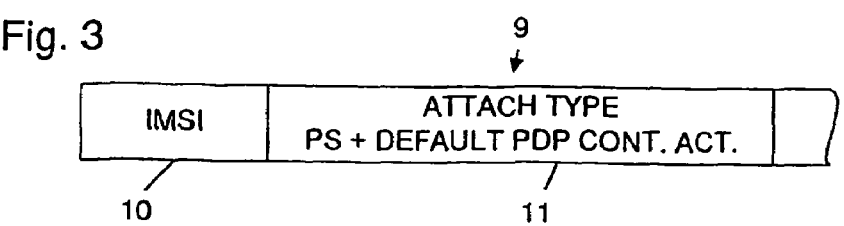

METHOD FOR ATTACHING A MOBILE EQUIPMENT TO A WIRELESS COMMUNICATION NETWORK

CROSS-REFERENCE TO RELATED APPLICATIONS

This is a division of patent application Ser. No. 10/381,937, filed on Sep. 22, 2003 which is a U.S. National Stage patent application based on PCT International Patent Application PCT/EP00/10111, filed Oct. 13, 2000. The disclosures of the prior applications are hereby incorporated by reference.

FIELD OF THE INVENTION

The present invention is directed to a method and device for attaching a mobile equipment such as a mobile station (MS) or any other arbitrary type of user equipment, to a wireless communication network so as to be able to originate or receive media such as a phone call, or data or message transmission. Further, the invention relates to a network element usable in such a method or system.

BACKGROUND OF THE INVENTION

When a user equipment is newly attached to a wireless communication network for receiving and/or originating calls, data transmissions or the like, an attachment process for attaching the user equipment to the wireless communication network is necessary. When a subscriber is then intending to originate or receive a message or a call, an additional communication channel establishment process may be necessary. For instance, in a GSM system (Global System for Mobile Communications) such as a packet switched service, for instance GPRS (General Packet Radio Service), or in a UMTS system (Universal Mobile Telecommunications System), the user equipment exchanges a signalling flow with its associated node for establishing a communication channel, for instance a PDP (Packet Data Protocol) context or the like. This signalling leads to an additional load on the network and may additionally result in a certain brief delay before actually being able to start the transmission or reception.

SUMMARY OF THE INVENTION

The present invention aims at providing a method and system which allow a novel manner of attachment and activation. In accordance with one aspect of the invention, the invention aims at reducing the signaling load on the network, and/or to reduce the delay before being able to start a transmission or receipt process.

The invention provides a system as defined in the independent system claim or any of the dependent system claims.

Furthermore, the invention provides a method as defined in the independent method claim and/or any of the dependent method claims.

According to one aspect of the invention, a combined attach and communication connection establishment process may be performed when attaching a user equipment such as a mobile station to the network. This combined attach and communication connection establishment process provides several advantages. For instance, the signaling load on the network is reduced as the attach and communication connection establishment process can be initiated by sending only one request from the user equipment to the network. Previously, two separate messages (first an attach request and then, later on, a separate communication connection (e.g. communication channel) establishment process for allowing a user traffic transmission/reception) were requested, with the necessity of sending two different requests from the user equipment to the network. In addition, after performing this combined attach and communication connection establishment process, the subscriber or his/her equipment is able to start immediately with any requested transmission or receipt process. Hence, the time delay previously experienced because of the necessity of performing an communication connection establishment process before starting the communication, is eliminated.

According to one aspect of the invention being also applicable with a normal activation procedure irrespective of any combined attach and activation procedure, a register contains some communication channel data which is set as default value and can therefore be automatically selected without necessity of specifying activation details by a support node or by a user equipment. In detail, one or many of the communication connection data sets provided for a subscriber in a register are set as a default value which can be automatically selected from the register when not receiving any selection request. This provision of a default value further reduces the signaling load as the user equipment now does not need to send any specific selection data for selecting communication connection data sets. The data transmission or other communication can immediately commence based on the selected default values.

When the wireless communication system is structured as a packet switched system such as GPRS or UMTS, the combined attach and communication connection establishment request may be a combined Attach and Activate PDP Context Request. A normal Activate PDP Context Request is defined in the GPRS standard or UMTS standard, see for instance the 3GPP specification TS 23.060.

The present invention is applicable to a great variety of telecommunication systems including call and/or data or message transmitting networks, and is preferably implemented in a mobile packet switched network using, for instance, PDP context for data transmission.

In accordance with another aspect, the invention provides a network element usable in a method or system as described above and explained below in more detail.

BRIEF DESCRIPTION OF THE DRAWINGS

FIG. 1 shows a basic layout of one embodiment of the invention being implemented as GPRS network;

FIG. 2 schematically illustrates the storage contents of a register of the wireless communication network;

FIG. 3 shows part of an attach request message for combined attach and PDP context activation;

FIG. 5 illustrates the signaling data flow during a combined attach and PDP context activation procedure; and.

DETAILED DESCRIPTION OF PREFERRED EMBODIMENTS OF THE INVENTION

Figure 4:
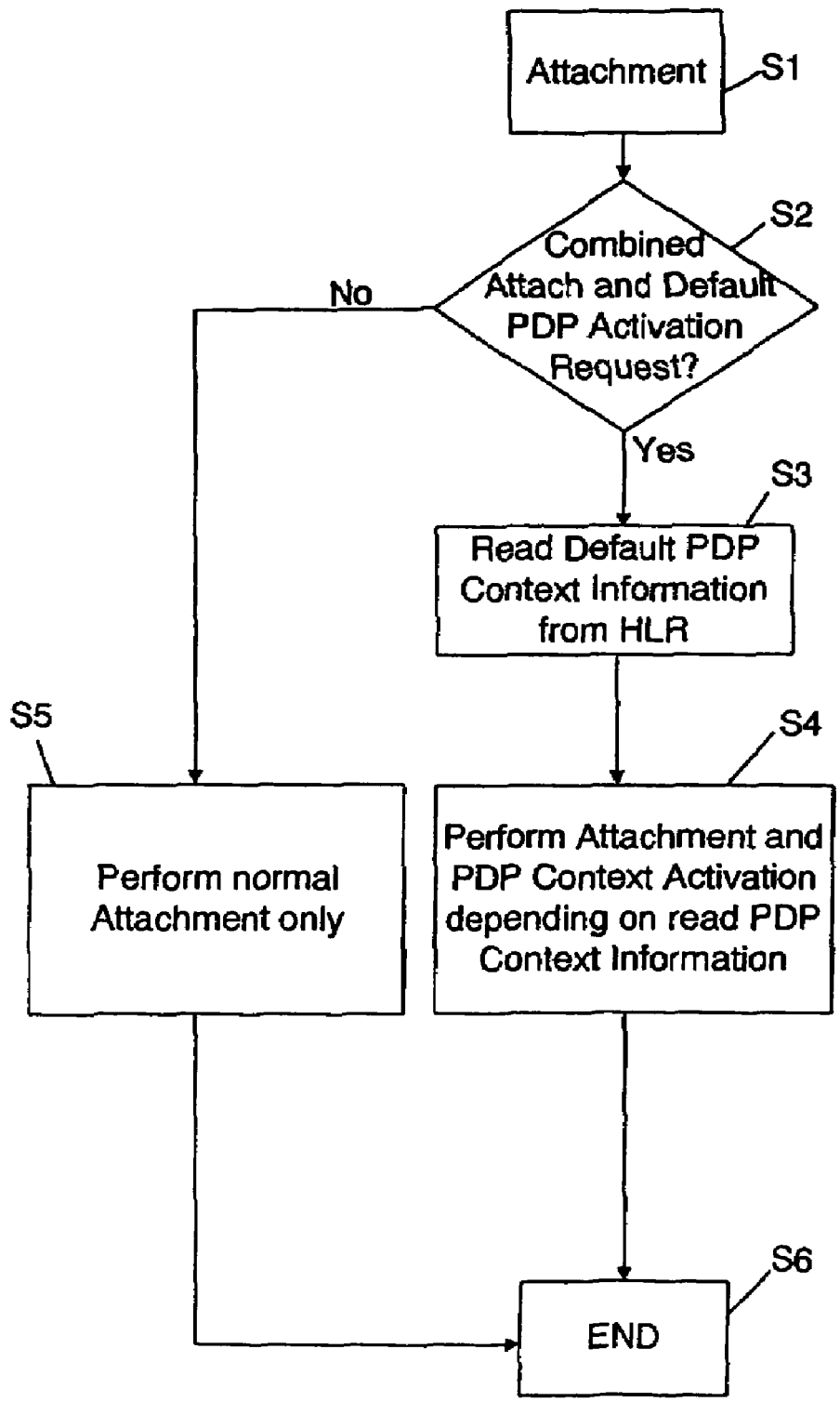
FIG. 4 is a flow diagram showing a combined attach and PDP context activation procedure.

FIG. 1 illustrates the basic layout of a part of a wireless communication network (for instance a PLMN) which here is implemented as a GPRS system. A mobile station (MS) 1 communicates with a Serving GPRS Support Node (SGSN) 2. The system comprises at least one Home Location Register (HLR) 3, at least one Gateway GPRS Support Node (GGSN) 4 and an Equipment Identification Rregister (EIR) 5. The parts may communicate with each other as indicated. by the arrows shown in FIG. 1. The system will normally contain a plurality of mobile stations or other user equipments 1 although only one mobile station is shown in FIG. 1. Likewise, a plurality of support nodes 2 is provided which support the mobile stations or other user equipments located within the area covered by the support nodes. This structure as well as the normal signaling and information flow between the components of the wireless communication network is known and will therefore not be described in greater detail.

FIG. 2 schematically illustrates part of the storage contents of a home location register 3. The register 3 stores, for each subscriber, or each group of subscribers, or at least for some of the subscribers or groups, at least one communication connection (e.g. channel) information set which here is designated as PDP context information, one of which is set as default value and is automatically selected when not receiving any specific selecting request pointing to a different PDP context information. The register (HLR) 3 includes subscription information and then information about the PDP contexts of the subscriber. One or many of the PDP contexts may be set as default.

In the present embodiment, for each subscriber, or at least some of the subscribers, three different PDP context information sets (for PDP context activation or creation, or the like) 6, 7, 8 are respectively stored, wherein context information 1 (reference numeral 6) is set as default value. The context information "Context 2", reference numeral 7, and "Context 3", reference numeral 8, are deliberately selectable by a subscriber when requested by the subscriber. The database of register 3 contains such triplets of information for each subscriber or at least for some of the subscribers or a group of subscribers. Of course, the number of alternative PDP context information sets may be varied according to design and need and may range from only one (default value only), to two, three or more selectively selectable information.

Generally, before the mobile station 1 is able to send or receive information, it must first perform an attach proceedings, for instance after switching it on. In addition, in some services such as packet data switching oriented networks, for instance GPRS or UMTS, an additional communication channel establishment procedure will normally be carried out which is called PDP context activation (or creation) in GPRS or UMTS. According to the present invention, the attach and PDP context activation processes are combined. The mobile stations can therefore perform a combined attach and default PDP context activation which decreases signaling in the radio interface (air-interface).

Figure 5:
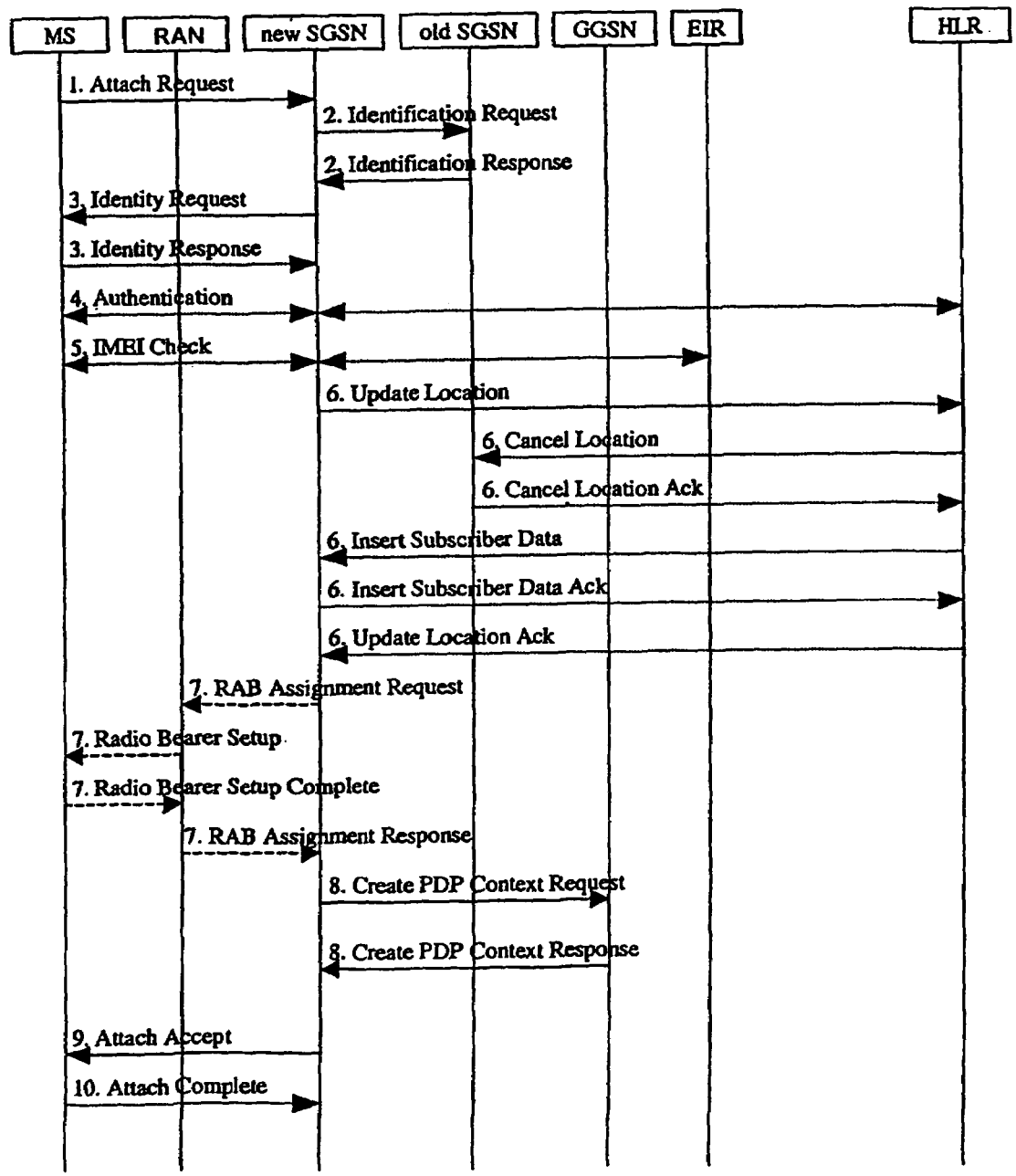

This combined attach and communication channel establishment procedure is shown in FIGS. 4 and 5. The default PDP context or contexts is (are) activated according to the subscription-based information stored in the register 3, that is based on "Context 1" information, reference numeral 6. If requested by the subscription of one or more subscribers, multiple default PDP contexts are allowed.

The quality of service (QoS) of the default PDP context is preferably such that the mobile station 1 is only charged if data is transferred or received on the default PDP context, but no time-based charging is performed for the default PDP context alone. The quality of service of the default PDP context will be decided based on the subscription and will be a default value unless otherwise prescribed. If a specific quality of service is desired, the subscriber will then have to select one of the different context information such as 7, or 8, provided same define an appropriate QoS (Quality of Service).

Subscribers mainly using the packet switched service (for instance GPRS or UMTS) for transferring voice, are allowed to define the QoS of the default PDP context appropriately.

FIG. 3 shows part of an Attach request 9 which is sent from the mobile station 1 to the support node 2 for initiating the attach procedure, which is, in the present invention, a combined attach and PDP context activation request. The Attach request 9 comprises a data field 10 defining IMSI (International Mobile Subscriber Identifier) or, if available, P-TMSI and RAI (Routing Area Identity). The "Attach Type" field 11 of the Attach request 9 indicates which type of attach is to be performed which may basically be "GPRS attach only", "GPRS attach while already IMSI attached", "combined GPRS/IMSI attach" or, as indicated in FIG. 3, combined "PS (packet switched)+default PDP context activation".

In case the attach request transmitted from the mobile station 1 specifies the attach type "PS+DEFAULT PDP CONTEXT ACTIVATION" as shown in FIG. 3, the system is informed on the desired combined attach and PDP context activation. The support node 2 then not only performs a "packet switched" attach but is furthermore adapted so as to automatically initiate, when receiving this request and having the attachment effected, a default PDP context activation without necessity for the mobile station 1 to send any additional command.

The attach request 9 contains further fields such as "DRX parameters" which are not shown in FIG. 3 and are in accordance with the customary specification of attach requests, see the respective standards. The attach request 9 differs from these standards only in so far as it is now possible to indicate, in field 11, a combined attach and communication channel establishment process such as "attach and default PDP context activation".

FIG. 4 shows an attach process flow. In step S1, the mobile station 1 sends an Attach request to the support node 2 which then checks, in step S2, the received Attach request so as to detect whether a normal attach such as a "packet switched" attach is requested, or a combined attach and default PDP context activation request is transmitted. This check is performed by examining the data field 11 of the Attach request 9 specifying the desired attach type. When combined attach and default PDP activation request is received by the support node 2, same is adapted to address the Home Location Register 3, and to read (or receive) the subscriber information including the default PDP context information stored therein. All the subscription information if transferred from the HLR to the SGSN. In step S4, the system then performs an attachment as well as one or many PDP context activations depending on the read default PDP context information.

If no combined attach and default PDP activation request is detected in step S2, the process proceeds to step S5 and performs a normal attachment only according to the designated attach type. As part of steps S4, S5, the support node 2 may also send an Attach Accept message to the mobile station 1 for informing same on the effected attachment. The attach process then ends (step S6).

FIG. 5 shows the combined attach and PDP context activation in greater detail.

In step 1., the mobile station 1 initiates an attach and default PDP context activation by sending an Attach Request as shown in FIG. 3. The Attach Type parameter 11 indicates that combined attach and default PDP context activation is required. In the present case, the Attach Request is sent because the mobile station 1 has switched on. In step 2., the new support node 2 (new SGSN) sends an Identification Request to the old support node (old SGSN) which responds with an Identification Response defining the IMSI of the mobile station 1. If the mobile station 1 should be unknown in both the old and new SGSN, the new support node sends an Identity Request to the mobile station 1 (step 3.) which transmits an Identity Response indicating its IMSI. In step 4., an authentication may be performed. Further, in step 5., an equipment checking ("IMEI check; IMEI=International Equipment Identification") may be performed by addressing the Equipment Identification Register (EIR) 5.

In step 6., the support node 2 informs the Home Location Register 3 on the new location in case the support node number has changed since the GPRS detach, or it is the very first attach. The old support node is requested to cancel the location which is acknowledged by sending back an Cancel Location Acknowledgment.

Further, the Home Location Register 3 sends an Insert Subscriber Data to the new support node 2 which subscriber data includes information on the default PDP context(s). The new support node validates the MS's presence in the new routing area, and sends back an Insert Subscriber Data Acknowledgement to the Home Location Register 3. Furthermore, the Home Location Register 3 sends back, as part of step 6, an Update Location Acknowledgement message.

In step 7., RAB assignment procedure is performed for the default PDP context(s) according to the information received from the Home Location Register 3 in step 6. This is a preferred implementation of the invention. The procedure consists in sending a RAB Assignment Request from the new support node 2 to the radio access network RAN transmitting/receiving the radio waves to/from the mobile station 1, setting up the radio bearer between the radio access network RAN and MS (by sending a Radio Bearer Setup and a Radio Bearer Setup Complete, and finally sending a RAB Assignment Response.

In the next step 8., the new support node 2 sends a Create PDP Context Request to the gateway support node 4 so that the default PDP context(s) is (are) activated in the support node(s) 4 according to the information received from the Home Location Register 3 in step 6. In step 9., the support node 2 sends an Attach Accept message to the mobile station 1 for acknowledging the attach and default PDP context activation. The attached accept message may include information about the activated PDP context(s). The mobile station 1 may acknowledge the parameters sent by the support node 2, by sending an Attach Complete message in step 10. However, step 10. may also be omitted.

Steps 7 and 8 are performed N times, N representing the number of default PDP contexts.

According to the invention, the combined attach and default PDP context activation is therefore performed by storing default PDP context information in a register such as a Home Location Register, and by activating the default PDP context(s) according to the subscriber-based information stored in the register. The quality of service (QoS) of the default PDP context(s) may be fixed but may also be decided based on the subscription.

A basic idea is to activate default PDP context(s) according to the subscription information received from the HLR. As an alternative, the mobile station MS may send some parameters for the default PDP context(s) and the HLR completes the missing parameters. As an example, APN (Access Point Name) may be sent from MS, and QoS from HLR.

The PDP context activation(s) is (are) therefore automatically performed based on the HLR subscription. This leads to a reduction of the signalling in the radio interface, without creating any limitations on the network and its use. Furthermore, it is not necessary, for PDP context activation, to send a QoS field and/or APN from the mobile station 1 to support node 2 or 3, because the Home Location Register has one or more special contexts which are marked as default contexts and are automatically selected. This possibility of setting default contexts in the Home Location Register has also advantages with regard to more advanced services such as UMTS services wherein the users are likely to have more than one subscribed context, which accordingly define different session handling parameters.

Figure 6:
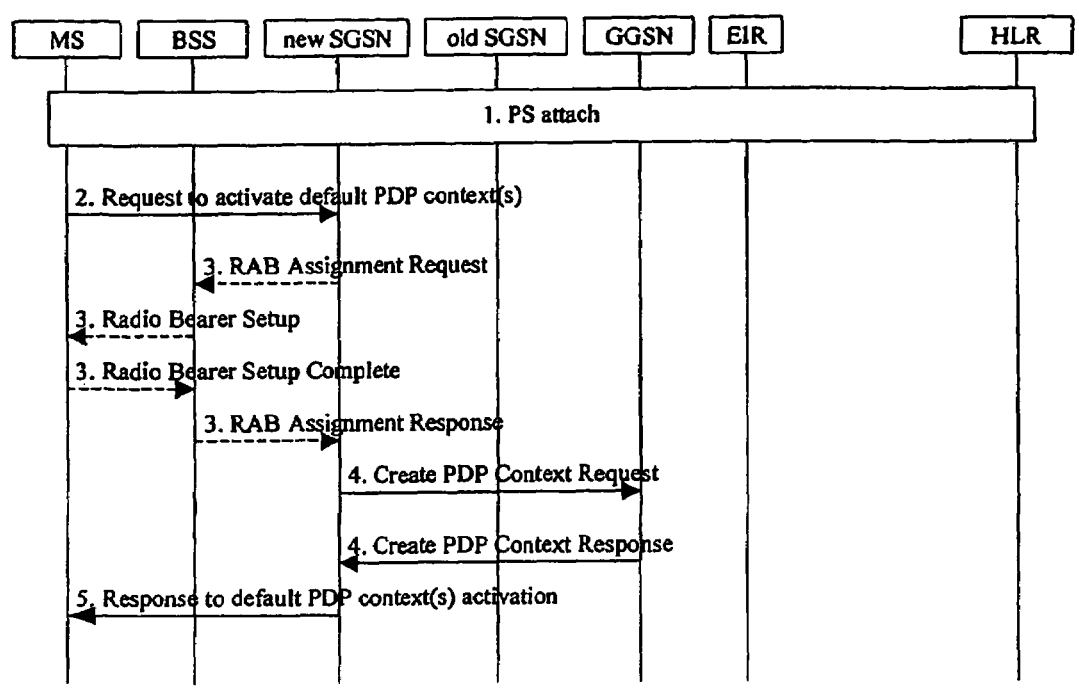
FIG. 6 shows another embodiment and illustrates the signaling data flow during a PS attach and subsequent default PDP context activation procedure.

FIG. 6 illustrates a further embodiment.

In the first embodiment shown in FIGS. 1 to 5, the default PDP context(s) are automatically activated at PS attach. In the embodiment of FIG. 6, the MS first performs a PS attach and then afterwards indicates that the default PDP context(s) should be activated. In both cases, the default PDP context information comes from the HLR.

According to the embodiments, default contexts are provided also in cases where a normal procedure (attach being performed with a subsequent PDP context activation upon request) does not apply.

In the following, the steps shown in FIG. 6 will be described in more detail with reference to the step numbering of FIG. 6:

Step 1.. PS (Packet-Switched) attach is performed (e.g. as described in 3GPP TSG 23.060).

Step 2. The MS sends a request to activate default PDP context(s) to the SGSN.

Step 3. The SGSN initiates the activation of the default PDP context(s) as indicated in the subscription information received from the HLR at PS attach (step 1). The radio access bearer establishment procedure may be performed.

Step 4. The SGSN sends the Create PDP Context Request message to the GGSN for each default PDP context. The GGSN creates the PDP context and acknowledges by sending the Create PDP Context Response message to the SGSN.

Step 5. The SGSN acknowledges the activation of the default PDP context(s) by sending a response to the MS.

The response may include information about the activated PDP context(s).

Although specific embodiments have been described above, the invention is also applicable with regard to other types of communication networks such as fixed or circuit-switched networks.

The invention claimed is:

1. A method comprising:

sending an attach request to a network, wherein the attach request is configured to trigger a create communication connection default procedure with a gateway device;

receiving a radio bearer establishment request;

establishing a radio bearer; and generating a bearer establishment response.

2. A method according to claim 1, wherein the method is performed by a mobile station or a user equipment.

3. A method according to claim 1, wherein the attach request comprises a data field specifying a desired type of attachment.

4. A method comprising:

sending an attach request configured to attach a mobile device to a network, trigger a create communication connection default procedure with a gateway device in response to the attach request, and generate a radio bearer establishment request;

receiving a message to establish a radio bearer; and
sending a bearer establishment response.

5. A method comprising:
receiving an attach request to attach a mobile device to a network;
triggering a create communication connection default procedure with a gateway device in response to the attach request;
generating a radio bearer establishment request;
establishing a radio bearer; and
receiving a bearer establishment response.

6. A method according to claim 4, wherein the method is performed by a mobile station or a user equipment.

7. A method according to claim 4, wherein the attach request comprises a data field specifying a desired type of attachment.

8. A method according to claim 5, wherein the method is performed by a support node.

9. A method according to claim 5, wherein the attach request comprises a data field specifying a desired type of attachment.

* * * * *